US012638367B2

(12) United States Patent
Tooley

(10) Patent No.: US 12,638,367 B2
(45) Date of Patent: May 26, 2026

(54) MULTIPOINT GAS INPUT SWITCHING

(71) Applicant: ECOTEC SOLUTIONS, INC., Colton, CA (US)

(72) Inventor: Jamie Tooley, Beaumont, CA (US)

(73) Assignee: ECOTEC SOLUTIONS, INC., Colton, CA (US)

( * ) Notice: Subject to any disclaimer, the term of this patent is extended or adjusted under 35 U.S.C. 154(b) by 366 days.

(21) Appl. No.: 18/543,941

(22) Filed: Dec. 18, 2023

(65) Prior Publication Data

US 2024/0201053 A1    Jun. 20, 2024

Related U.S. Application Data

(60) Provisional application No. 63/476,242, filed on Dec. 20, 2022.

(51) Int. Cl.
*G01N 1/26* (2006.01)
*E21B 34/00* (2006.01)

(52) U.S. Cl.
CPC .............. *G01N 1/26* (2013.01); *E21B 34/00* (2013.01)

(58) Field of Classification Search
CPC ........................................................ G01N 1/26
See application file for complete search history.

(56) References Cited

U.S. PATENT DOCUMENTS

| | | |
|---|---|---|
| 2,994,344 A | 8/1961 | Kerley |
| 3,748,906 A | 7/1973 | Manka |

| | | |
|---|---|---|
| 3,927,670 A | 12/1975 | Turney et al. |
| 4,402,910 A | 9/1983 | Smith et al. |
| 4,491,730 A | 1/1985 | Pedersen |
| 4,578,762 A | 3/1986 | Wong |
| 4,676,313 A | 6/1987 | Rinaldi |
| 4,890,672 A | 1/1990 | Hall |
| 4,943,161 A | 7/1990 | Michaelis et al. |
| 5,146,092 A | 9/1992 | Apperson et al. |
| 5,453,621 A | 9/1995 | Wong |
| 5,695,641 A | 12/1997 | Cosulich et al. |

(Continued)

FOREIGN PATENT DOCUMENTS

| | | |
|---|---|---|
| AU | 2003232276 A1 | 12/2003 |
| CN | 105257408 A | 1/2016 |

(Continued)

OTHER PUBLICATIONS

Basu et al, "In situ simultaneous measurements of temperature and water partial pressure in a PEM fuel cell under steady state and dynamic cycling," Journal of Power Sources, Elsevier, Amsterdam, NL, vol. 159, No. 2, lb Jan. 2006, pp. 987-994.

(Continued)

*Primary Examiner* — Herbert K Roberts
(74) *Attorney, Agent, or Firm* — Knobbe, Martens, Olson & Bear LLP

(57) ABSTRACT

A gas input switching device (also referred to as a "multipoint system") receives gas samples from multiple gas sources (e.g., gas wells or other gas source) for testing using a gas analyzer (e.g., a laser sensor). Advantageously, using the multipoint system discussed herein, multiple individual gas sources may be analyzed by a single gas analyzer by alternating input to the gas analyzer between the multiple gas lines, such as according to a multipoint switching algorithm.

14 Claims, 10 Drawing Sheets

Analyzing Gas from W1, While Priming W2

(56) References Cited

U.S. PATENT DOCUMENTS

| | | | |
|---|---|---|---|
| 5,705,816 A | 1/1998 | Ronge et al. | |
| 5,977,546 A | 11/1999 | Carlson | |
| 6,061,637 A | 5/2000 | Sorge et al. | |
| 6,167,767 B1 | 1/2001 | Mengel et al. | |
| 6,169,962 B1 | 1/2001 | Brookshire et al. | |
| 6,241,950 B1* | 6/2001 | Veelenturf | G01N 1/26 |
| | | | 422/537 |
| 6,832,164 B1 | 12/2004 | Stella et al. | |
| 6,995,846 B2 | 2/2006 | Kalayeh et al. | |
| 6,999,883 B1 | 2/2006 | Brady et al. | |
| 7,027,931 B1 | 4/2006 | Jones et al. | |
| 7,075,653 B1 | 7/2006 | Rutherford | |
| 7,352,463 B2 | 4/2008 | Bounaix | |
| 7,499,169 B2 | 3/2009 | Hurvitz et al. | |
| 8,021,612 B2 | 9/2011 | Tooley | |
| 8,404,184 B2 | 3/2013 | Tooley | |
| 9,167,100 B2 | 10/2015 | Bang | |
| 9,189,944 B2 | 11/2015 | Johnson et al. | |
| 10,190,392 B1 | 1/2019 | Bachus et al. | |
| 10,440,168 B2 | 10/2019 | Endo | |
| 10,533,965 B2 | 1/2020 | Wang et al. | |
| 10,554,886 B2 | 2/2020 | Rydberg | |
| 10,705,063 B2 | 7/2020 | Campanella et al. | |
| 10,775,297 B2 | 9/2020 | Jourdainne | |
| 10,928,371 B1 | 2/2021 | Smith et al. | |
| 11,222,477 B2 | 1/2022 | Moon et al. | |
| 11,273,473 B2 | 3/2022 | Quigley et al. | |
| 11,313,752 B2 | 4/2022 | Jourdan | |
| 11,867,815 B2 | 1/2024 | Sun et al. | |
| 11,867,816 B2 | 1/2024 | Sun et al. | |
| 12,467,857 B2 | 11/2025 | Vidal | |
| 12,504,369 B1 | 12/2025 | Tooley et al. | |
| 2001/0005812 A1 | 6/2001 | Brookshire et al. | |
| 2002/0020451 A1* | 2/2002 | Reid, II | F15B 13/0892 |
| | | | 137/884 |
| 2002/0150516 A1 | 10/2002 | Pahlman et al. | |
| 2003/0072009 A1 | 4/2003 | Domash et al. | |
| 2004/0079887 A1 | 4/2004 | May | |
| 2005/0018193 A1 | 1/2005 | Chilese et al. | |
| 2005/0036147 A1 | 2/2005 | Sterling et al. | |
| 2005/0087027 A1* | 4/2005 | Widmer | G01N 1/2258 |
| | | | 73/863.02 |
| 2005/0134859 A1 | 6/2005 | Kalayeh et al. | |
| 2006/0119851 A1 | 6/2006 | Bounaix | |
| 2006/0288799 A1 | 12/2006 | Kielb et al. | |
| 2007/0113686 A1* | 5/2007 | Desrochers | G01N 1/22 |
| | | | 73/863.33 |
| 2007/0224085 A1 | 9/2007 | Tooley | |
| 2007/0229834 A1 | 10/2007 | Patel et al. | |
| 2008/0088821 A1 | 4/2008 | Hurvitz et al. | |
| 2008/0123712 A1 | 5/2008 | Zhou et al. | |
| 2009/0200180 A1 | 8/2009 | Capote et al. | |
| 2009/0217772 A1 | 9/2009 | Reeve | |
| 2010/0275702 A1 | 11/2010 | Kinback et al. | |
| 2012/0011104 A1 | 1/2012 | Tooley | |
| 2012/0062895 A1 | 3/2012 | Rao | |
| 2012/0287418 A1 | 11/2012 | Scherer et al. | |
| 2012/0297868 A1 | 11/2012 | Elkins | |
| 2013/0036811 A1* | 2/2013 | Boult | G01N 1/26 |
| | | | 73/152.27 |
| 2013/0044314 A1 | 2/2013 | Koulikov et al. | |
| 2014/0034840 A1 | 2/2014 | Davenport et al. | |
| 2014/0034970 A1 | 2/2014 | Li et al. | |
| 2014/0349707 A1 | 11/2014 | Bang | |
| 2015/0177208 A1 | 6/2015 | Murphy | |
| 2015/0362468 A1 | 12/2015 | Gerhold | |
| 2016/0266034 A1 | 9/2016 | Helbley et al. | |
| 2017/0090486 A1 | 3/2017 | Chrin | |
| 2017/0356552 A1 | 12/2017 | Cassel | |
| 2018/0059003 A1 | 3/2018 | Jourdainne | |
| 2018/0268581 A1 | 9/2018 | Demuth | |
| 2020/0086365 A1 | 3/2020 | Campanella et al. | |
| 2020/0258764 A1* | 8/2020 | Penley | G05D 7/0647 |

| | | | |
|---|---|---|---|
| 2021/0302267 A1 | 9/2021 | Tao et al. | |
| 2021/0318236 A1 | 10/2021 | Sun et al. | |
| 2021/0321174 A1 | 10/2021 | Sun et al. | |
| 2022/0113290 A1 | 4/2022 | Smith et al. | |
| 2023/0314261 A1 | 10/2023 | Schulte et al. | |
| 2023/0324264 A1* | 10/2023 | Prince | G01N 1/24 |
| | | | 73/863.02 |
| 2024/0027338 A1 | 1/2024 | Vidal | |
| 2024/0061120 A1 | 2/2024 | Sun et al. | |
| 2024/0142351 A1 | 5/2024 | Miller et al. | |

FOREIGN PATENT DOCUMENTS

| | | | |
|---|---|---|---|
| CN | 105372199 A | 3/2016 | |
| CN | 205538667 U | 8/2016 | |
| CN | 107024440 A | 8/2017 | |
| CN | 107035972 A | 8/2017 | |
| CN | 206740177 U | 12/2017 | |
| CN | 207471129 U | 6/2018 | |
| CN | 207527300 U | 6/2018 | |
| CN | 108399717 A | 8/2018 | |
| CN | 109030374 A | 12/2018 | |
| CN | 208705222 U | 4/2019 | |
| DE | 4323283 A1 | 2/1994 | |
| EP | 1070943 A1 | 1/2001 | |
| GB | 2286458 A | 8/1995 | |
| WO | 93/15391 A1 | 8/1993 | |
| WO | 2003/103864 A1 | 12/2003 | |
| WO | 2004/023114 A1 | 3/2004 | |
| WO | 2005/047872 A1 | 5/2005 | |
| WO | 2013/175287 A2 | 11/2013 | |
| WO | 2014/107370 A1 | 7/2014 | |
| WO | 2016/171918 A1 | 10/2016 | |
| WO | 2017/173402 A2 | 10/2017 | |
| WO | 2018/038152 A1 | 3/2018 | |
| WO | 2021/081754 A1 | 5/2021 | |

OTHER PUBLICATIONS

Cattaneo H et al, "VCSEL based detection of water vapor near 940nm" Spectrochimica Acta. Part A: Molecular and Biomolecular Spectroscopy, Elsevier, Amsterdam, NL, vol. 60, No. 14, Dec. 2004, pp. 3269-3275.

Extended European Search Report for 17187635.2 dated Jan. 2, 2018 in 28 pages.

Extended European Search Report, dated Aug. 5, 2024, in European Application No. EP 21865065.3.

International Preliminary Report on Patentability, re PCT Application No. PCT/CN2019/100307, dated Feb. 25, 2021.

International Preliminary Report on Patentability, re PCT Application No. PCT/US07/16449, dated Jan. 20, 2009.

International Preliminary Report on Patentability, re PCT Application No. PCT/US2021/048738, dated Mar. 16, 2023.

International Search Report and Written Opinion, re PCT Application No. PCT/CN2019/100307, dated Oct. 30, 2019.

International Search Report and Written Opinion, re PCT Application No. PCT/US02/28377, dated Sep. 5, 2003.

International Search Report and Written Opinion, re PCT Application No. PCT/US07/16449, dated Mar. 17, 2008.

International Search Report and Written Opinion, re PCT Application No. PCT/US2021/048738, dated Dec. 22, 2021.

Office Action, dated Jul. 10, 2025, in European Application No. EP 21865065.3.

Phone interview itinerary for Apr. 27, 2011.

Search Report for Application No. GB 0701867.4, filed Jan. 31, 2007.

Song K et al, "Application of laser photoacoustic spectroscopy for the detection of water vapor near 1.38 mum," Microchemical Journal, New York, NY, US, vol. 80, No. 2, Jun. 2005, pp. 113-119.

U.S. Appl. No. 18/481,895 titled "Vertical Emissions Monitoring Manifold," filed Oct. 5, 2023.

* cited by examiner

100

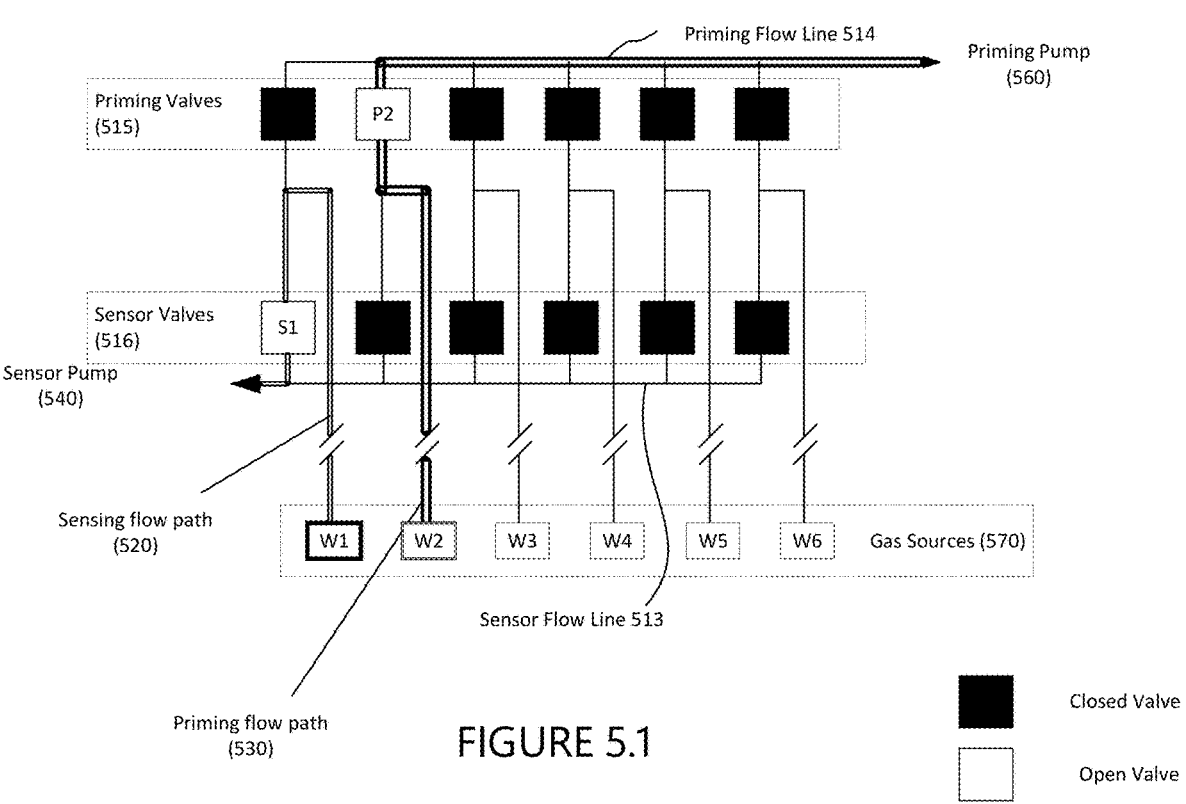
FIGURE 5.1

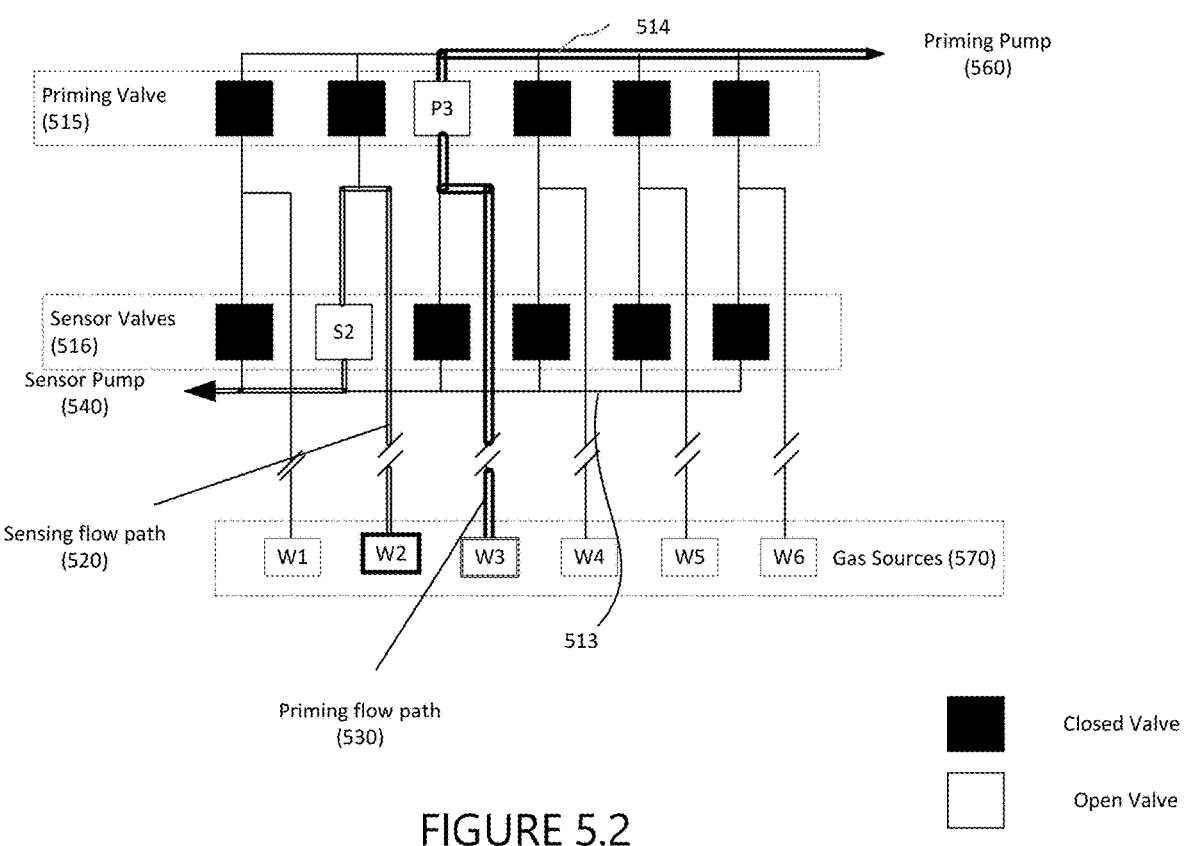
FIGURE 5.2

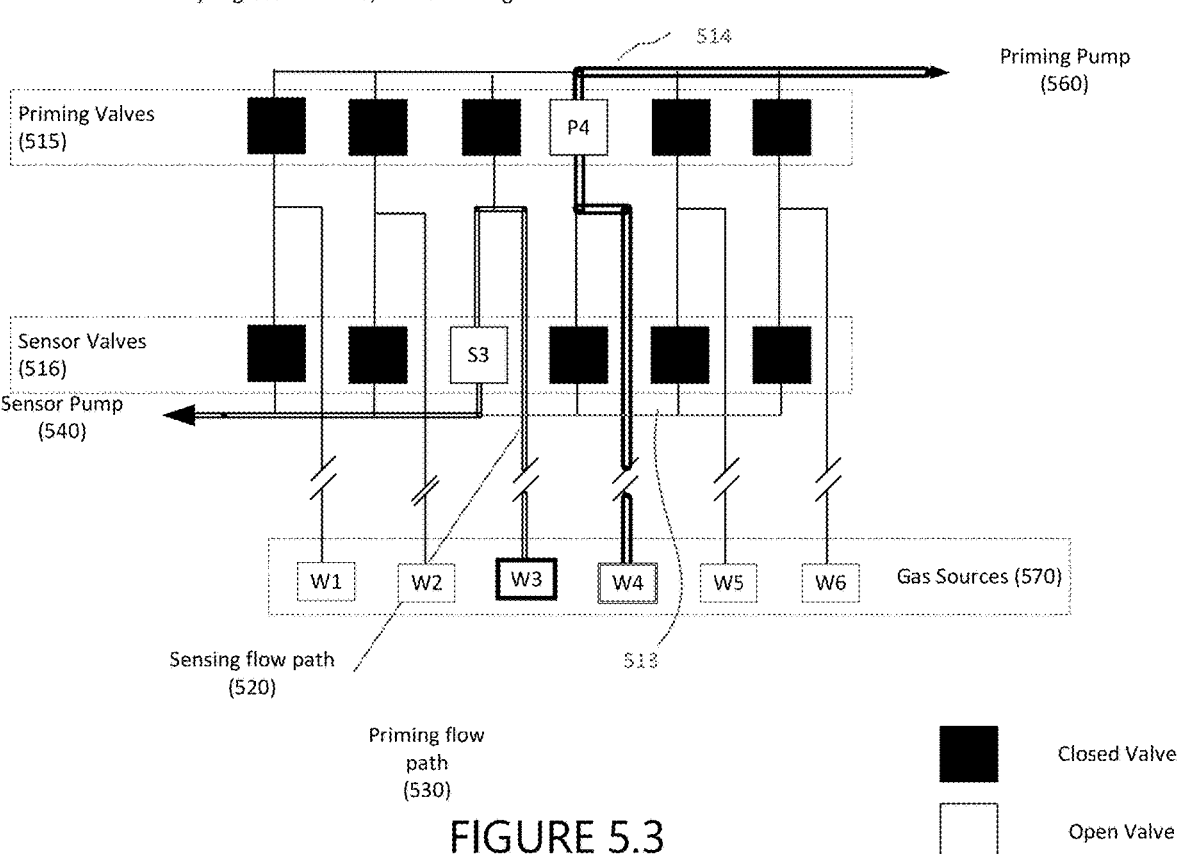
FIGURE 5.3

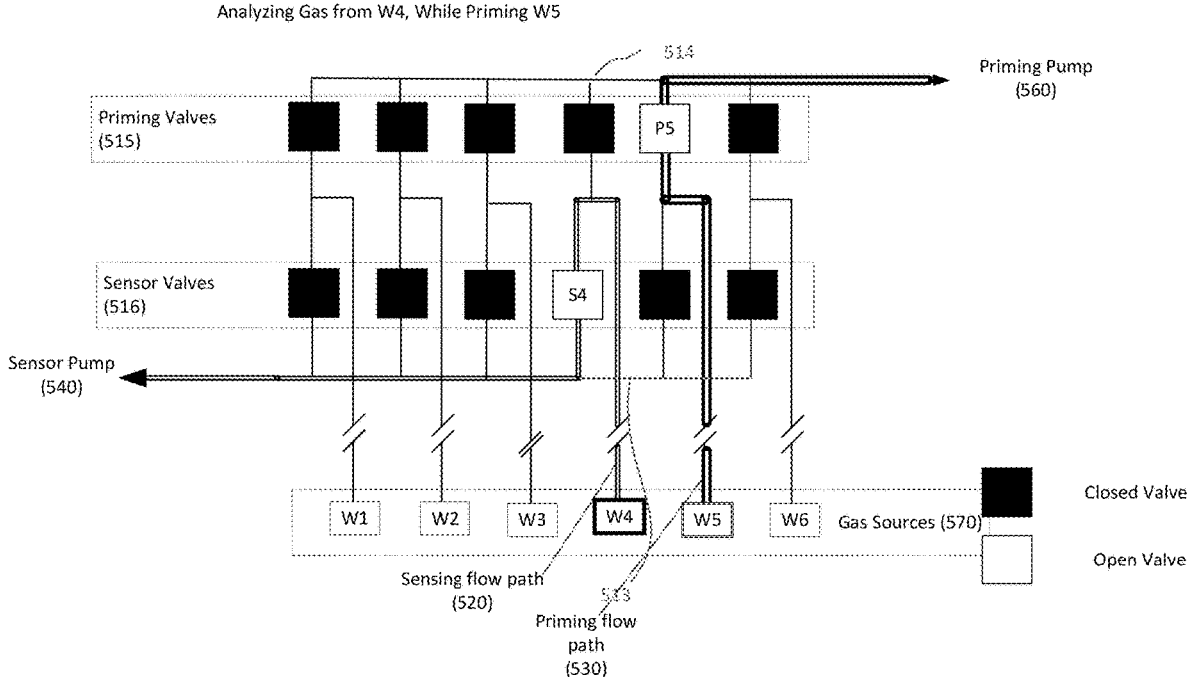
FIGURE 5.4

FIGURE 5.5

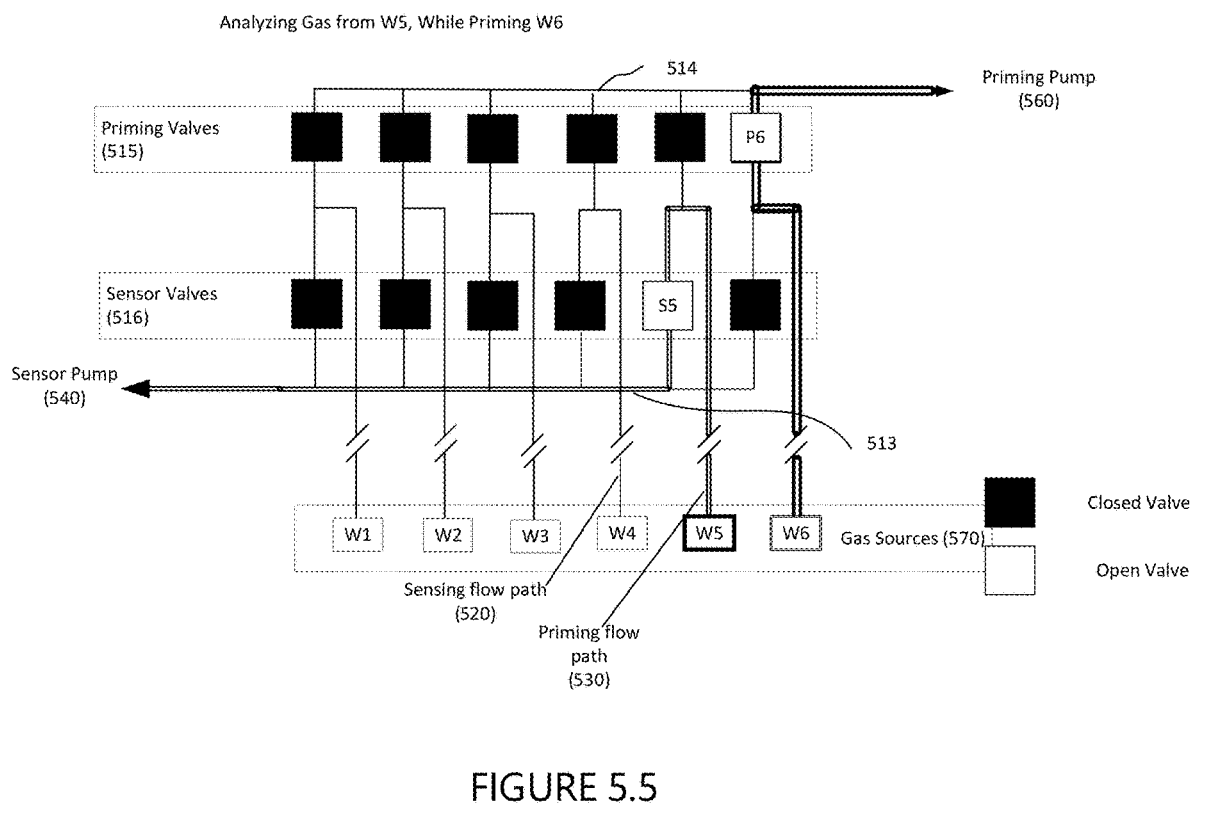

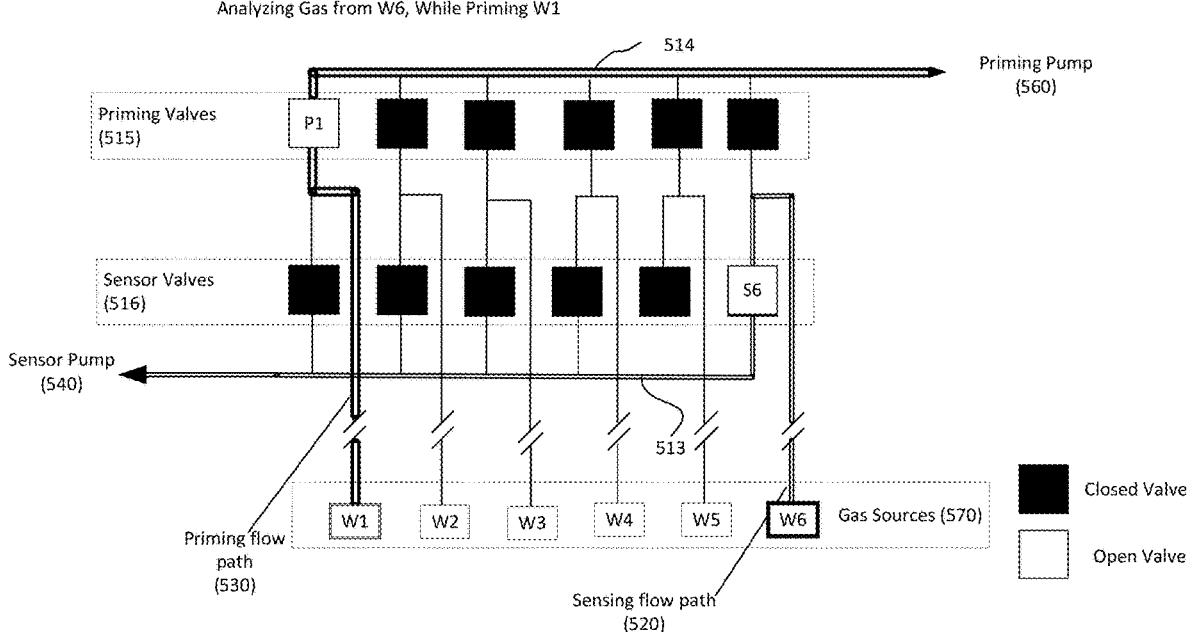
FIGURE 5.6

MULTIPOINT GAS INPUT SWITCHING

BACKGROUND

Gas extraction sites, such as those for methane production, have multiple wellheads that extract gas from underground locations. These wellheads are often fitted with various components like connectors, valves, and ports that are susceptible to wear and tear due to atmospheric conditions and regular use. As a result, leaks may develop over time, leading to the unintended release of gases like methane into the atmosphere. Such leaks pose risks to air quality and can be hazardous to both humans and animals in the vicinity. In extreme cases, the release of methane can even cause fires or explosions.

SUMMARY

A gas input switching device (also referred to as a "multipoint system") receives gas samples from multiple gas sources (e.g., gas wells or other gas source) for testing using a gas analyzer (e.g., a laser sensor). Advantageously, using the multipoint system discussed herein, multiple individual gas sources may be analyzed by a single gas analyzer by alternating input to the gas analyzer between the multiple gas lines, such as according to a multipoint switching algorithm.

BRIEF DESCRIPTION OF THE FIGURES

FIG. 5 (which includes FIGS. 5.1 through 5.6) illustrates an example sequence of activating and deactivating valves of a multipoint sensing system, such as based on a multiple switching algorithm that is executed by a flow control system.

DETAILED DESCRIPTION

Figure 1:
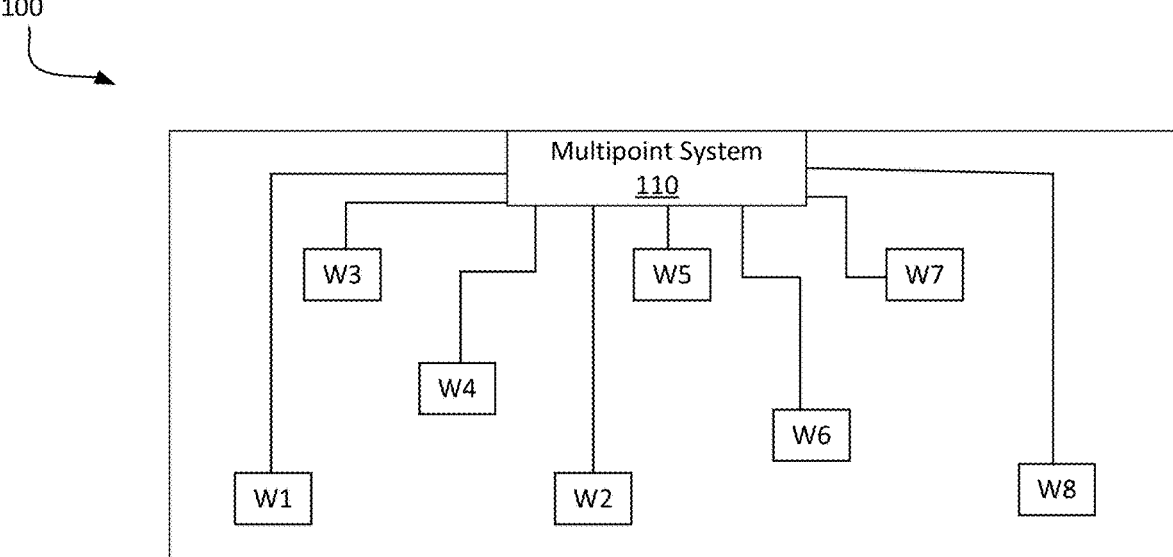
FIG. 1 is a block diagram illustrating a gas extraction site including eight gas sources (e.g., gas wells in one embodiment) labeled W1-W8.

FIG. 1 is a block diagram illustrating a gas extraction site 100 including eight gas sources (e.g., gas wells in one embodiment) labeled W1-W8. As shown in this embodiment, each of the eight gas sources is coupled to a multipoint system 110, which includes a gas analyzer, and gas from the gas sources W1-18 are selectively drawn into the multipoint system 110 for analysis (e.g., methane content analysis). As discussed in further detail below, in some embodiments the gas lines connecting the gas sources to the multipoint system are each coupled to a solenoid valve (or simply "valve") that selectively opens and closes the valves to allow gas from a single gas line (and corresponding gas source) to flow into a single gas analyzer. In some embodiments, a priming pump (e.g., a single large pump) may also be connected to all gas lines to keep pressure on the gas lines (even the closed gas lines) so when their sensing valve is open for flow to the gas analyzer, the gas line is already full and the gas is immediately ready for sensing (rather than requiring time for gas to be sucked through the entire gas line when the sensing valve is opened for sensing).

The example gas extraction site 100 may be a methane production site that removes methane (and other gases) from underground or any other site. While certain examples herein described detection of methane, the gas analysis systems and methods may be used to detect other constituents in gas, such as benzene, hydrogen sulfide, etc. The example gas sources discussed herein may be referred to as wellheads for ease of illustration. Each of the gas sources may include one or more connectors, valves, ports, etc., configured to receive extracted gas via one or more pipes that extend from underground to an air intake area that may be 2, 5, 10, 25 or more feet below the surface. In some embodiments, at least some of the gas sources are connected to an underground pipe that moves gas extracted from another location. For example, a gas source may not extract gas directly from the ground, but may receive gas extracted from other locations within the gas extraction site via an underground (or aboveground) pipe.

Figure 2:
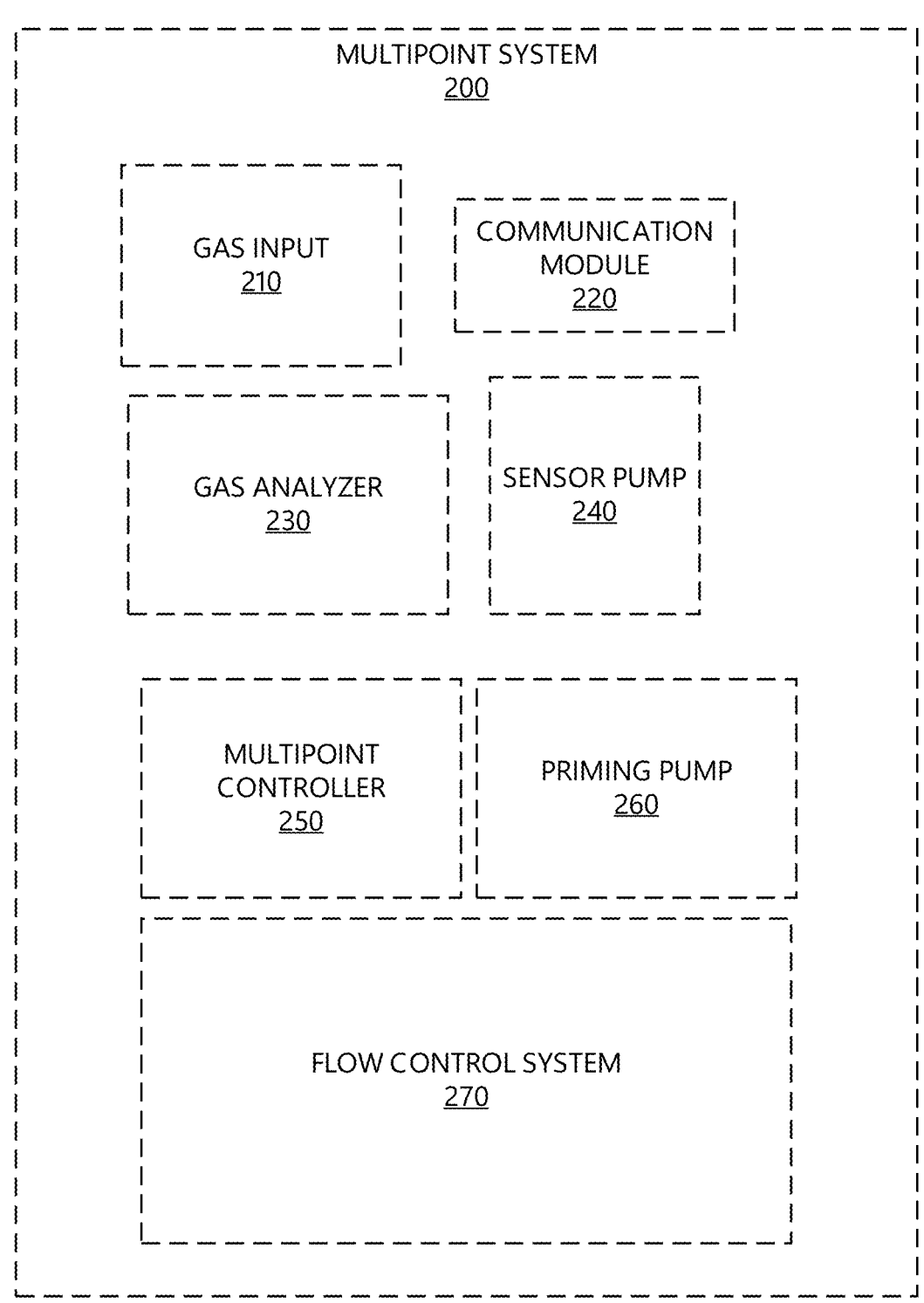
FIG. 2 is a block diagram of an example multipoint system.
Figure 3:
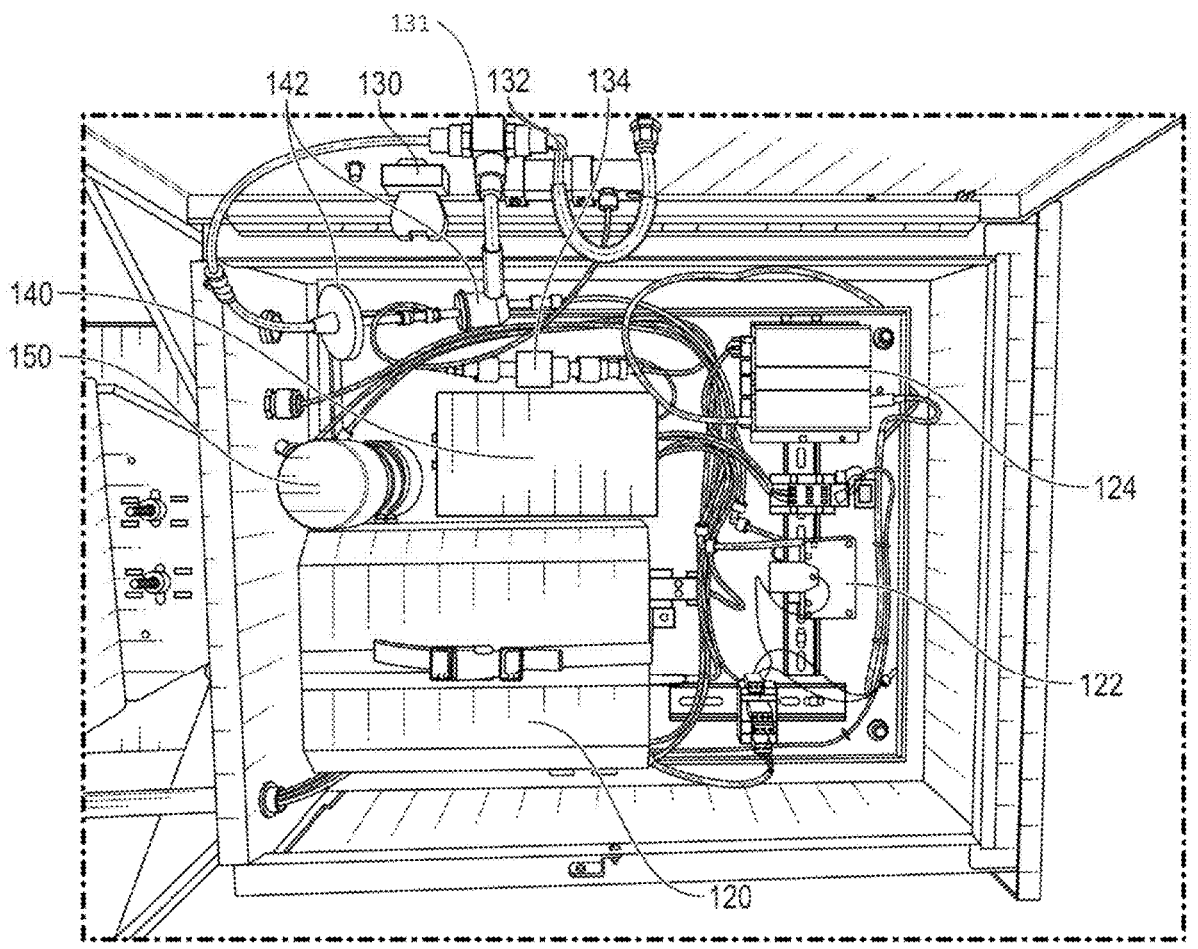
FIGS. 3 and 4 are diagrams of one implementation of a multipoint system that may be discussed in context with the block diagram of FIG. 2.
Figure 4:
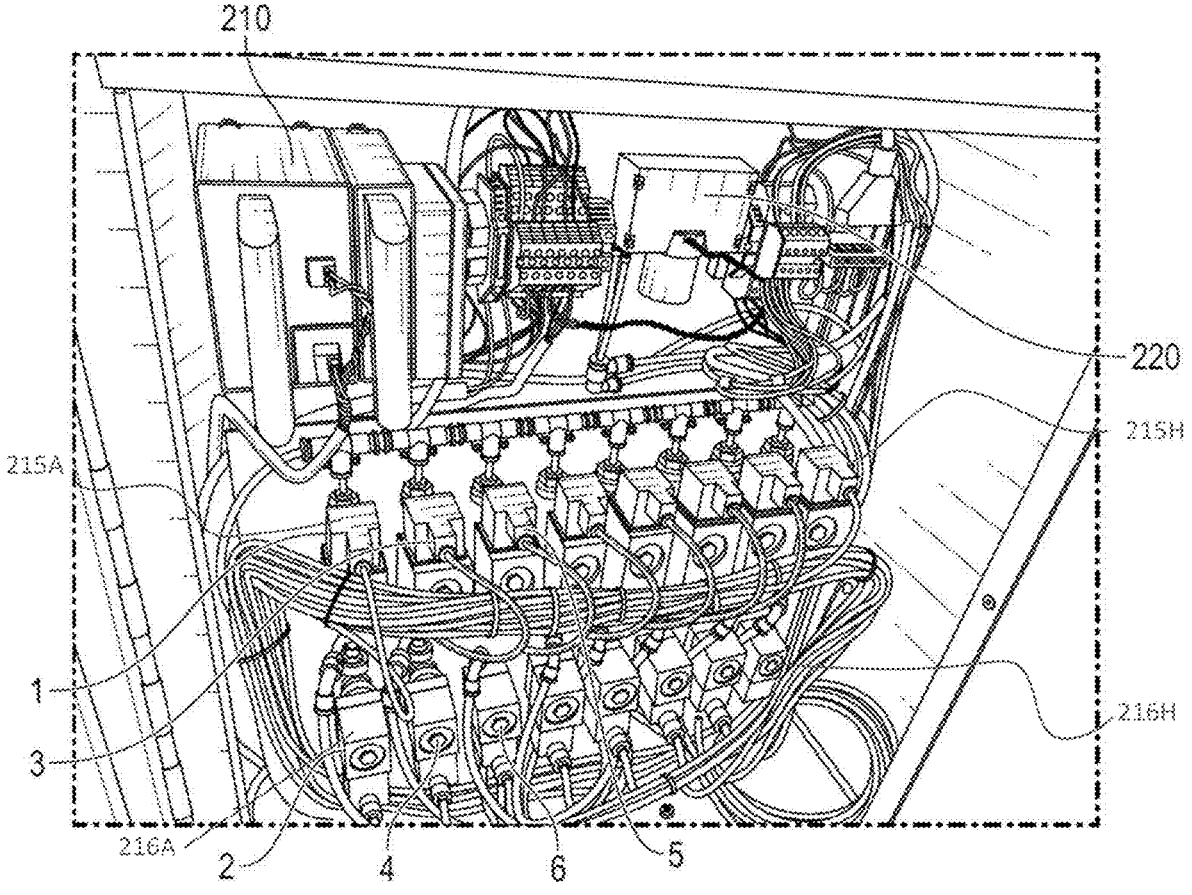

FIG. 2 is a block diagram of an example multipoint system 200 and FIGS. 3 and 4 are diagrams of one implementation of a multipoint system that may be discussed in context with the block diagram of FIG. 2. As noted herein, a multipoint system may be configured to selectively pump gas from a particular gas line (e.g., a particular gas well) into a gas analyzer, while at the same time priming another gas line and corresponding gas well for subsequent gas analysis.

In the example of FIG. 2, the multipoint system 200 includes a gas analyzer 230 that is coupled to gas input 210 configured to supply gas for analysis by the gas analyzer 230 (e.g., to detect methane and/or other chemical compositions). The gas analyzer 230 is also coupled to a sensor pump 240 configured to apply negative pressure to draw gas from the gas input 210 into the gas analyzer 230. The gas input 210 includes an air intake that is coupled to a sensor flow line that is part of the flow control system 270, which will be described in further detail below. In general, the flow control system 270 executes a multipoint switching algorithm to selectively provide the gas input 210 with gas from one of multiple gas lines that are coupled to the flow control system 270.

In one embodiment, the gas analyzer 230 includes a laser-based methane emission sensor that uses tunable diode laser ("TDL") technology. Laser sensors may advantageously require little or no warm-up time, are not affected by cross-gas contamination, and provide accuracy to a parts per billion ("PPB") level. Examples of laser absorption spectroscopy sensors, as well as other environmental sensors and configurations of sensors, are described in U.S. Pat. No. 7,352,463, issued on Apr. 1, 2008, which is hereby incorporated herein by reference in its entirety and for all purposes, including teachings regarding Herriot-type sensing devices. Additionally, the gas analyzers discussed may include one or more sensors configured to detect one or more other parameters of a sample gas. The sensors may be any type, shape, and/or size. For example, a gas analyzer may include one or more sensor configured to temperature, pressure, humidity, chemical composition, particulate level (e.g., air quality), etc. of gas that is received via an intake port.

In the example of FIG. 2, the priming pump 260 is coupled to a priming flow line (not shown in FIG. 2) and configured to apply a priming pressure (e.g., negative air pressure) to multiple gas lines leading to gas sources. For example, in some embodiments the flow control system 270 creates a flow path between a single gas line and the gas input 210 so that gas from the single gas line is analyzed by the gas analyzer 230, while creating a separate flow path between another gas line (coupled to another gas well) and the priming pump 260 so that gas line is primed for subsequent analysis by the gas analyzer 230. In this embodiment, while one gas line is providing gas for analysis by the gas analyzer and another gas line is being primed by the priming pump, the timing and sensing valves associated with the remaining gas lines are closed.

In the example of FIG. 2, a communication module 220 may receive input and/or provide output to any of the components illustrated in FIG. 2 and may communicate with one or more external computing systems, such as via wireless digital communication signals. For example, the communication module 220 may receive inputs from the gas analyzer 230 indicating results of analysis of gas from each of multiple gas lines (and corresponding gas wells), and may communicate the information to a cloud computing system, which may be configured to provide the information to any Internet connected devices.

FIGS. 3-4 are example diagrams of certain components discussed above generally with reference to FIG. 2. Starting with FIG. 3, a gas analyzer 120 receives gas for analysis via a gas intake port 142. In this embodiment, the gas sample passes through a dampener 150, which generally removes or lessens pressure waves and, thus, levels the amount of gas flow and/or pressure of gas from the intake port 142, before entering the gas analyzer. A sensor pump 122 provides a negative pressure to draw gas that from the intake port 142 (that has been dampened and conditioned). In this example, a protocol controller 140 may comprise one or more microprocessors configured to convert serial inputs to Modbus outputs, for example.

In the example of FIG. 3, a flow sensor 134 configured to monitor flow rate of gas and provide the sensed flow rate to a communication module 124, which may provide information to a cloud computing system and/or other computing devices. In some embodiments, the multipoint system and/or a cloud computing system that receives the flow rate data, may trigger an alert if the flow rate (sensed by the flow sensor 134) is outside of an expected flow rate range. For example, a text message, email, push notification, etc. may be transmitted to a device of a user that can analyze the data and determine if maintenance or repairs are needed at the multipoint system. In the example of FIG. 3, a visual flow port 132 is also provided for visual inspection by an on-site user. The example of FIG. 3 also includes additional gas conditioning components 142, such as humidity or particle filters.

Moving to FIG. 4, a multipoint controller 210 is shown in communication with a plurality of solenoid valves (or simply "valves") that are selectively activated (opened for airflow) and deactivated (closed for airflow) based on a multipoint switching algorithm, for example. In some embodiments, the multipoint controller 210 comprises one or more programmable logic controllers ("PLCs"), microprocessors, graphics processors, and/or any other electrical components configured to execute a sensing algorithm. In the example of FIG. 4, a priming pump 220 is coupled to each of the plurality of gas lines, such as via a priming flow line.

The example flow control system of FIG. 4 includes eight priming valves 215A-215H and eight sensing valves 216A-216H. In this example, each of the pairs of priming and sensing valves (e.g., the pair of priming valve 215A and sensing valve 216A) are coupled to a gas line that, in turn, is coupled to a gas source from which gas is to be extracted for analysis by the gas analyzer. For example, the gas source may be a gas well that is positioned up to several hundred (or more) feet away from the physical position of the multipoint system. Furthermore, the different gas sources (e.g., the gas sources that are coupled to the flow control system of FIG. 4) may be positioned different distances and/or elevations from the multipoint system.

As discussed further below, in some embodiments a multipoint switching algorithm cycles through activation of a single sensing valve 216 and a single priming valve 215, while the remaining sensing and priming valves are inactive. For example, the sensing valve 216H may be activated concurrent with activation of the priming valve 215A, which creates a sensing flow path from a first gas source coupled to the sensing valve 216H while also creating a priming flow path from a second gas source coupled to the priming valve 215A. Accordingly, at this stage the first gas source supplies gas to the gas analyzer, while gas from the second gas source is primed (e.g., fills the gas line coupled to the priming flow line).

FIG. 5 (which includes FIGS. 5.1 through 5.6) illustrates an example sequence of activating and deactivating valves of a multipoint sensing system, such as based on a multiple switching algorithm that is executed by a flow control system. In this example configuration, a flow control system comprises six priming valves 515 (labeled as P1-P6 in FIG. 5) and six sensing valves 516 (labeled as S1-S6 in FIG. 5). The priming valves 515 are each coupled to a priming flow line 514 that is coupled to a priming pump 560. The sensor valves 516 are each coupled to a sensor flow line 513 that is coupled to a sensor pump 540. In this example, the valves (including the priming and sensing valves 515, 516) are activated (open) and deactivated (closed) by electrical inputs from a multipoint controller (e.g., the multipoint controllers 250 or 210). In FIG. 5, closed valves are indicated as filled with solid black and open valves are indicated as only an outline (no fill). The gas sources 570 (labeled as W1-W6 in FIG. 5) are each coupled to a separate gas flow line that connects each of the gas sources to a priming valve 515 and a sensor valve 560. For example, gas source W1 is coupled to both priming valve P1 and sensor valve S1, gas source W2 is coupled to both priming valve P2 and sensor valve S2, and so on.

FIGS. 5.1 through 5.6 illustrate example sequencing of valve activations (and deactivations) that allows sensing of gas from an individual gas source 570, while at the same time priming another gas source 570 for subsequent gas analysis. In other embodiments, a multipoint system may be coupled to any other quantity of gas sources and the sequencing of valve activations (and deactivations) may vary in order, duration, etc.

Beginning with FIG. 5.1, gas from gas source W1 is being sensed by a gas analyzer via flow through a sensing flow path 520 and the open sensor valve S1. The remaining sensor valves S2-S6 are closed at this stage, so pressure applied by the sensor pump 540 draws gas only from the gas source W1. In this configuration, the gas source W2 is primed via flow through a priming flow path 530 and the open priming valve P2 that is created by pressure from the priming pump 560. The remaining priming valves P1, P3-P6 are closed at this stage, so pressure applied by the priming pump 560 draws gas only from the gas source W2.

Moving to FIG. 5.2, a second stage of a multipoint switching sequence (e.g., as executed by a multipoint switching algorithm) is illustrated. This second stage may automatically be implemented after the first stage (FIG. 5.1) has been active for a predetermined time (e.g., 10 seconds) or dynamically (e.g., based on determination when a reliable reading from W1 has been obtained), and/or on other factors, such as may be determined by a machine learning algorithm configured to monitor performance of the multipoint system and optimize the multipoint switching algorithm). In this second stage of the multipoint switching sequence, gas from gas source W2 is being sensed by the same gas analyzer via flow through the sensing flow path 520, which now extends from W2 through sensor valve S2 via pressure applied by the sensor pump 540. In this configuration, the sensor valve S1 has been closed, which stops the flow of gas from gas source W1 to the gas analyzer (as illustrated in FIG. 5.1). In addition to closure of sensor valve S1, sensor valves S3-S6 remain closed. Thus, gas from only gas source W2 is drawn by the sensor pump 540 for sensing by the gas analyzer. At the stage illustrated in FIG. 5.2, the gas line coupled to gas source W3 is primed by the priming pump 560 drawing gas along the priming flow path 530, which now extends from W3 through priming valve P3. The priming valve P2 has been closed, which stops the flow of gas from gas source W2 towards the priming pump 560 (as illustrated in FIG. 5.1). In addition to closure of priming valve P2, priming valves P1, P4-P6 remain closed. Thus, gas from only gas source W3 is drawn by the priming pump 560 to prime the gas flow line of W3.

FIG. 5.3 shows a third stage of a multipoint switching sequence (e.g., as executed by a multipoint switching algorithm). This third stage may automatically be implemented after the second stage (FIG. 5.2) according to a multipoint switching algorithm. In this third stage, gas from gas source W3 is being sensed by the same gas analyzer via flow through the sensing flow path 520, which now extends from W3 through sensor valve S3 via pressure applied by the sensor pump 540. In this configuration, the sensor valve S2 has been closed, which stops the flow of gas from gas source W2 to the gas analyzer (as illustrated in FIG. 5.2). In addition to closure of sensor valve S2, sensor valves S1, S4-S6 remain closed. Thus, gas from only gas source W3 is drawn by the sensor pump 540 for sensing by the gas analyzer. At the stage illustrated in FIG. 5.3, the gas line coupled to gas source W4 is primed by the priming pump 560 drawing gas along the priming flow path 530, which now extends from W4 through priming valve P4. The priming valve P3 has been closed, which stops the flow of gas from gas source W3 towards the priming pump 560 (as illustrated in FIG. 5.2). In addition to closure of priming valve P3, priming valves P1, P2, P5-P6 remain closed. Thus, gas from only gas source W4 is drawn by the priming pump 560 to prime the gas flow line of W4.

FIG. 5.4 shows a fourth stage of a multipoint switching sequence (e.g., as executed by a multipoint switching algorithm). This fourth stage may automatically be implemented after the third stage (FIG. 5.3) according to a multipoint switching algorithm. In this fourth stage, gas from gas source W4 is being sensed by the same gas analyzer via flow through the sensing flow path 520, which now extends from W4 through sensor valve S4 via pressure applied by the sensor pump 540. In this configuration, the sensor valve S3 has been closed, which stops the flow of gas from gas source W3 to the gas analyzer (as illustrated in FIG. 5.3). In addition to closure of sensor valve S3, sensor valves S1, S2, S5-S6 remain closed. Thus, gas from only gas source W4 is drawn by the sensor pump 540 for sensing by the gas analyzer. At the stage illustrated in FIG. 5.4, the gas line coupled to gas source W5 is primed by the priming pump 560 drawing gas along the priming flow path 530, which now extends from W5 through priming valve P5. The priming valve P4 has been closed, which stops the flow of gas from gas source W4 towards the priming pump 560 (as illustrated in FIG. 5.3). In addition to closure of priming valve P4, priming valves P1, P2, P3, P6 remain closed. Thus, gas from only gas source W5 is drawn by the priming pump 560 to prime the gas flow line of W5.

FIG. 5.5 shows a fifth stage of a multipoint switching sequence (e.g., as executed by a multipoint switching algorithm). This fifth stage may automatically be implemented after the fourth stage (FIG. 5.4) according to a multipoint switching algorithm. In this fifth stage, gas from gas source W5 is being sensed by the same gas analyzer via flow through the sensing flow path 520, which now extends from W5 through sensor valve S5 via pressure applied by the sensor pump 540. At this stage, the sensor valve S4 has been closed, which stops the flow of gas from gas source W4 to the gas analyzer (as illustrated in FIG. 5.4). In addition to closure of sensor valve S4, sensor valves S1, S2, S3, S6 remain closed. Thus, gas from only gas source W5 is drawn by the sensor pump 540 for sensing by the gas analyzer. At the stage illustrated in FIG. 5.5, the gas line coupled to gas source W6 is primed by the priming pump 560 drawing gas along the priming flow path 530, which now extends from W6 through priming valve P6. The priming valve P5 has been closed, which stops the flow of gas from gas source W5 towards the priming pump 560 (as illustrated in FIG. 5.4). In addition to closure of priming valve P5, priming valves P1, P2, P3, P4 remain closed. Thus, gas from only gas source W6 is drawn by the priming pump 560 to prime the gas flow line of W6.

FIG. 5.6 shows a sixth stage of a multipoint switching sequence (e.g., as executed by a multipoint switching algorithm). This sixth stage may automatically be implemented after the fifth stage (FIG. 5.4) according to a multipoint switching algorithm. In this sixth stage, gas from gas source W6 is being sensed by the same gas analyzer via flow through the sensing flow path 520, which now extends from W6 through sensor valve S6 via pressure applied by the sensor pump 540. At this stage, the sensor valve S5 has been closed, which stops the flow of gas from gas source W5 to the gas analyzer (as illustrated in FIG. 5.5). In addition to closure of sensor valve S5, sensor valves S1, S2, S3, S4 remain closed. Thus, gas from only gas source W6 is drawn by the sensor pump 540 for sensing by the gas analyzer. At the stage illustrated in FIG. 5.6, the gas line coupled to gas source W1 is primed by the priming pump 560 drawing gas along the priming flow path 530, which now extends from W1 through priming valve P1. The priming valve P6 has been closed, which stops the flow of gas from gas source W6 towards the priming pump 560 (as illustrated in FIG. 5.5). In addition to closure of priming valve P6, priming valves P2, P3, P4, P5 remain closed. Thus, gas from only gas source W1 is drawn by the priming pump 560 to prime the gas flow line of W1.

In some implementations, the stages illustrated in FIGS. 5.1-5.6 are continuously repeated, such as based on timing determined by a multipoint switching algorithm. Thus, the first stage illustrated in FIG. 5.1 is executed after the sixth stage illustrated in FIG. 5.6, followed by the second stage (FIG. 5.2), and so on.

In some embodiments, each of the gas sources (e.g., W1-W6) may be from a single air intake or may be a mixed gas obtained from a vertical emission monitoring system, such as is described in detail in U.S. application Ser. No. 18/481,895, titled "Vertical Emissions Monitoring Manifold," filed on Oct. 5, 2023, the entirety of which is hereby incorporated by reference.

Implementation Mechanisms

In various embodiments of the present disclosure, the gas analyzer and/or other components of a multipoint gas analysis system can include one or more special-purpose computing devices. The special-purpose computing devices can be hard-wired to perform the various techniques described herein, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hardwired and/or program logic to implement the techniques. In some embodiments, the gas analyzer may be controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the gas analyzer can be controlled by a proprietary operating system. Conventional operating systems control and schedule computer processes for execution, perform memory management, provide file system, networking, I/O services, and provide a user interface functionality, such as a graphical user interface ("GUI"), among other things. Thus, the gas analyzer may execute software instructions (e.g., in one or more modules) to perform the various features discussed herein)

In some embodiments, the gas analyzer includes a bus or other communication mechanism for communicating information, and a hardware processor, or multiple processors, coupled with bus for processing information. Hardware processor(s) can be, for example, one or more general purpose microprocessors.

In some embodiments, the gas analyzer includes a main memory, such as a random access memory (RAM), cache and/or other dynamic storage devices, coupled to bus for storing information and instructions to be executed by processor. Main memory also can be used for storing temporary variables or other intermediate information during execution of instructions to be executed by processor. Such instructions, when stored in storage media accessible to processor, render main board into a special-purpose machine that is customized to perform the operations specified in the instructions. Main memory can also store cached data, such as zoom levels and maximum and minimum sensor values at each zoom level.

In some embodiments, the gas analyzer further include a read only memory (ROM) or other static storage device coupled to bus for storing static information and instructions for processor. A storage device, such as a magnetic disk, optical disk, or USB thumb drive (Flash drive), etc., is provided and coupled to bus for storing information and instructions. For example, the storage device can store measurement data obtained from a plurality of sensors.

In some embodiments, the gas analyzer can be coupled via bus to a display, such as a cathode ray tube (CRT) or LCD display (or touch screen), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display.

In some embodiments, the gas analyzer can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Terminology

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device. Volatile media includes dynamic memory, such as main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and can possibly include such components as memory, input/output devices, and/or network interfaces, among others. The term "a" as used herein should also be given an inclusive rather than exclusive interpretation. For example, unless specifically noted, the term "a" should not be understood to mean "one" or "one and only one"; instead, the term "a" generally means "one or more" in open-ended claims or embodiments when used with language such as "comprising" or "including." Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. No matter how detailed the foregoing appears in text and/or drawings, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A multipoint gas analyzer system comprising:
a plurality of gas intake lines coupled to respective of a plurality of a gas sources positioned at different locations of a gas extraction site;
a plurality of sensor valves coupled at first ends to respective gas intake lines and at second ends to a gas analyzer flow line, wherein each of the sensor valves is configured to selectively allow gas to pass through the sensor valve;
a plurality of priming valves coupled at first ends to respective gas intake lines and at second ends to a priming flow line, wherein each of the priming valves is configured to selectively allow gas to pass through the priming valve;
a gas analyzer coupled to the gas analyzer flow line and configured to identify methane content in gas in the gas analyzer flow line;
a priming pump coupled to the priming flow line;
a controller comprising one or more microprocessors, the controller electronically configured to selectively activate individual sensor valves and priming valves so that at a first time:
a first sensor valve coupled to a first gas source is opened allowing gas from the first gas source to flow through the gas intake line into the gas analyzer, with the remaining of the plurality of sensor valves closed; and
a second priming valve coupled to a second gas source is opened allowing gas from the second gas source to flow through the priming flow line, with the remaining of the plurality of priming valves closed;
wherein at a second time:
the first sensor valve is closed;
the second priming valve is closed;
a second sensor valve coupled to the second gas source is opened allowing gas from the second gas source to flow through the gas intake line into the gas analyzer, with the remaining of the plurality of sensor valves closed; and
a third priming valve coupled to a third gas source is opened allowing gas from the third gas source to flow through the priming flow line, with the remaining of the plurality of priming valves remaining closed;
wherein the controller is configured to prioritize gas sources based on one or more environmental factors and at least one of recent gas concentration levels or operational efficiency.

2. The multipoint gas analyzer system of claim 1, wherein at a third time:

the second sensor valve is closed;

the third priming valve is closed;

a third sensor valve coupled to the third gas source is opened allowing gas from the third gas source to flow through the gas intake line into the gas analyzer, with the remaining of the plurality of sensor valves closed; and a fourth priming valve coupled to a fourth gas source is opened allowing gas from the fourth gas source to flow through the priming flow line, with the remaining of the plurality of priming valves remaining closed.

3. The multipoint gas analyzer system of claim 1, wherein the controller is configured to cycle through activation of a single sensor valve and single priming valve according to a multipoint switching algorithm.

4. The multipoint gas analyzer system of claim 1, wherein the controller is configured to adjust timing of opening and closing of the sensor valves and priming valves based on real-time methane concentration data obtained from the gas analyzer.

5. The multipoint gas analyzer system of claim 4, wherein the controller is further configured to adjust a sequence of valve activation based on historical data patterns of methane concentrations from the gas sources.

6. The multipoint gas analyzer system of claim 1, wherein the gas analyzer is additionally configured to identify other constituents in the gas, including at least one of carbon dioxide, hydrogen sulfide, and nitrogen.

7. The multipoint gas analyzer system of claim 6, wherein the controller adjusts valve operation based on concentration of one or more constituents.

8. The multipoint gas analyzer system of claim 1, further comprising a data storage unit configured to store data related to gas concentrations and valve operation history.

9. The multipoint gas analyzer system of claim 8, wherein the stored data is utilized by the controller to optimize future valve operations and gas analysis cycles.

10. The multipoint gas analyzer system of claim 1, wherein each of the gas intake lines includes a sensor for detecting pressure changes, and the controller is configured to use pressure change data to further refine valve operation.

11. The multipoint gas analyzer system of claim 1, wherein the multipoint switching algorithm is configured to prioritize gas sources based on recent gas concentration levels, environmental factors, and operational efficiency.

12. The multipoint gas analyzer system of claim 1, wherein the priming pump is configured to adjust its operation dynamically in response to changes in pressure on the priming flow line detected by one or more pressure sensors.

13. The multipoint gas analyzer system of claim 1, further comprising a user interface component configured to generate a user interface that displays real-time and historical data of gas concentrations and valve operations for monitoring and manual control purposes.

14. A method of analyzing gas from multiple sources at a gas extraction site using a multipoint gas analyzer system, the method comprising:

providing a plurality of gas intake lines, each coupled to a respective gas source positioned at different locations of the gas extraction site, wherein a plurality of sensor valves are coupled at first ends to respective gas intake lines and at second ends to a gas analyzer flow line, wherein each sensor valve is configured to selectively allow gas to pass through, and wherein coupling a plurality of priming valves are coupled at first ends to respective gas intake lines and at second ends to a priming flow line, wherein each priming valve is configured to selectively allow gas to pass through;

performing gas analysis using a gas analyzer coupled to the gas analyzer flow line, configured to identify methane content in gas in the gas analyzer flow line;

operating a priming pump coupled to the priming flow line;

controlling, via a controller comprising one or more microprocessors, the selective activation of individual sensor valves and priming valves such that:

at a first time:

opening a first sensor valve coupled to a first gas source to allow gas from the first gas source to flow into the gas analyzer, while keeping other sensor valves closed; and opening a second priming valve coupled to a second gas source to allow gas from the second gas source to flow through the priming flow line, while keeping other priming valves closed; and at a second time:

closing the first sensor valve and the second priming valve; opening a second sensor valve coupled to the second gas source to allow gas from the second gas source to flow into the gas analyzer, while keeping other sensor valves closed; and opening a third priming valve coupled to a third gas source to allow gas from the third gas source to flow through the priming flow line, while keeping other priming valves closed;

wherein the controller is configured to prioritize gas sources based on one or more environmental factors and at least one of recent gas concentration levels or operational efficiency.

\* \* \* \* \*